(12) United States Patent
Cucchi et al.

(10) Patent No.: US 7,126,943 B2
(45) Date of Patent: Oct. 24, 2006

(54) METHOD AND APPARATUS FOR INTERFACING A PARALLEL CONNECTION

(75) Inventors: Silvio Cucchi, Gaggiano (IT); Luigi Ronchetti, Como (IT); Carlo Costantini, Casatenovo (IT)

(73) Assignee: Alcatel, Paris (FR)

( * ) Notice: Subject to any disclaimer, the term of this patent is extended or adjusted under 35 U.S.C. 154(b) by 1011 days.

(21) Appl. No.: 10/180,126

(22) Filed: Jun. 27, 2002

(65) Prior Publication Data
US 2003/0026299 A1    Feb. 6, 2003

(30) Foreign Application Priority Data
Jul. 5, 2001    (IT)    ............... MI2001A1421

(51) Int. Cl.
*H04Q 11/02* (2006.01)
*H04J 1/00* (2006.01)
*H04J 3/04* (2006.01)
*H04J 14/00* (2006.01)

(52) U.S. Cl. ............. 370/366; 370/480; 370/536; 370/476; 370/907

(58) Field of Classification Search ........... 370/366, 370/476, 480, 536, 907
See application file for complete search history.

(56) References Cited

OTHER PUBLICATIONS

Iguchi A., et al.: "Very Short Reach (VSR) OC-192/STM-64 Interface Based on Parallel Optics" Physical and Link Layer Working Group, OIF Implementation Agreement OIF-VSR4-01.0, pp. 1-21, Dec. 18, 2000.

*Primary Examiner*—Ricky Q. Ngo
*Assistant Examiner*—Feben Micale Haile
(74) *Attorney, Agent, or Firm*—Sughrue Mion, PLLC

(57) ABSTRACT

A method and apparatus for interfacing a parallel connection, the parallel connection transmitting high bit-rate signals for a short distance. The method comprises: receiving a synchronous N-bits input data flow at a first input frequency; inserting said input data flow into parallel packets having a given length; and outputting said packets having a given length at a second output frequency onto a M-wires parallel connection. The method further comprises the steps of: defining an elementary packet comprising M lines and B+1 columns; defining a parallel packet by employing an integer number of said elementary packets, said number of elementary packets being chosen in order to maintain a constant phase relationship between the input frequency and the output frequency according to a number of parity lines in the elementary packet and to a code factor onto the parallel connection; inserting the input data flow into said parallel packet; and sending said parallel packet with the input data flow inserted therein into said parallel connection.

13 Claims, 5 Drawing Sheets

METHOD AND APPARATUS FOR INTERFACING A PARALLEL CONNECTION

INCORPORATION BY REFERENCE OF PRIORITY DOCUMENT

This application is based on, and claims the benefit of, Italian Patent Application No. MI2001A001421 filed on Jul. 5, 2001, which is incorporated by reference herein.

BACKGROUND OF THE INVENTION

1. Field of the Invention

The present invention relates to a method and apparatus for interfacing a parallel connection.

2. Description of the Prior Art

When a digital communication system has to be established, in particular when synchronous communication systems have to be created, there is the need to implement short-distance connections, namely up to 300–600 m. For instance, said connections can be back plane or inter-shelf connections receiving a number of synchronous parallel flows at the inputs and multiplexing said flows on a certain number of output connections, which is generally lower than the number of input flows.

A good example is given by the SONET/SDH optical fibers networks, for which the Recommendation OIF (Optical Internetworking Forum) provides a standard for the short distance transmission for inter-shelf high-speed connections.

FIG. 1 illustrates an interface of the OC-192 VSR type.

Thus, FIG. 1 shows an interfacing apparatus 10 which receives at the input a data flow S64. The data flow comprises a STM-64 frame structure, namely a synchronous data flow at N bits, in particular where N is equal to 16. Therefore the input bit rate fi is 622.08 Mb/s. At the other side, the apparatus is connected to a M-bits optical connection O12, where in particular M is equal to 12. Therefore the optical connection operates at an output bit rate fo that is exactly twice the input bit rate fi (namely 1244.16 Mb/s).

The interfacing apparatus 10 is internally divided into two parallel paths, a transmission path 20 towards the optical connection O12, a receiving path 21 from the optical connection O12. In the direction towards the optical connection O12, the flow S64 finds firstly a parallel conversion element 11 carrying out the functions of synchronization of flow 64, namely of the STM-64 frame. The parallel conversion element further packets an information content CI into blocks of 240 bytes, synchronized with the frame itself. Still further, it adds parity bytes and error correction code bytes. Thus, M byte flows are obtained. In other words, the 16-bit word flow S64 which enters through the path 20, is re-allocated in packets P1 having M lines, one for each conductor/fiber that is available in the optical connection O12. Afterwards, the flow S64, converted to M bytes, is transmitted to a line encoder/serializer 12 which carries out the encoding of M flows and the conversion from parallel to serial. The so encoded and serialized flows are transmitted to a multiple electro-optical converter 13 which carries out the optical conversion for the output optical connection O12.

Vice-versa, from the optical connection O12 which enters the interfacing apparatus 10 on the reception path 21, the flows are first converted into an electric form through an electro-optical converter 14, then a line deserializer/decoder element 15 implements the M conversions of data from serial to parallel and the M independent decodings on M flows. Then, a parallel converter 16 carries out the depacketization by restoring the N bit frame structure and by performing flow delay compensation operations and error correction operations (no more than a single error for each block of 240 bytes). So, the synchronous N bit flow S64 is finally restored.

FIGS. 2a, 2b and 2c illustrate three occurrences of packets P1 of a type generated by the parallel link converter 11 according to the prior art: FIG. 2a illustrates the generic packet P1, FIG. 2b illustrates the packet P1 at the starting point of the flow S64, that is at the starting point of the frame structure STM-64, while FIG. 2c still illustrates the packet P1 at the starting point of the frame structure STM-64 after overwriting the necessary control bits that are requested for isolating the bytes of each single channel, for aligning the single flows one to each other and thus for restoring the frame structure of packets P1.

Each packet P1 is made-up of twelve lines because 12, that is the value of parameter M, is also the number of fibers of the optical connection O12, and of 24 columns, that is 24 bytes. The input frame structure contained in the flow S64, which is arranged on N-bit words, N being equal to 16, is aligned and therefore multiplexed on said lines or channels, namely it is inserted in a column bytewise manner in the first ten lines, which contain the information content CI or payload.

An eleventh parity byte line RP (XOR calculated on each one of the eight bits of the bytes of the respective column of information content, indicated in FIG. 2 by X1, X2, . . . X24) is added to these first ten lines. Said parity line RP is added to protect the operation of connection O12 also in the case of the single break of a fiber or fault of an electro/optical converter 13 or 14.

In addition, a twelfth line EDC is added consisting in 12 pairs of bytes: the first eleven pairs are the result of the calculation of an error detection code (CRC-16) that is applied, for each line, to the bytes of the 11 previous lines (indicated in FIG. 2 by CRC-1, CRC-2, . . . CRC-10 and CRC-P), while the twelfth pair contains the result of the calculation of the same error detection code when applied to the eleven pairs of previous bytes of the line EDC itself (indicated in FIG. 2 by CRC-C).

Said line EDC allows to identify the presence of errors in the packet P1 and, only in case of a single error, it is possible to correct it. In case of a single break of a fiber or of a fault of an electro/optical converter 13 or 14, no correction can be made.

Since the optical connection O12 is a parallel connection, each line or channel can reach the receiver downwards of the optical connection O12 (element 16 in FIG. 1) with a different delay. In order to provide the mutual re-alignment of channels and therefore to delimit the packets P1, each channel is codified by utilizing the known code 8B/10B and serialized in the element 12 of FIG. 1: this codification is usually employed in these cases, as it provides a signal with a high rate of transitions, continuously balanced and furthermore it allows to outline the bytes if some special control words are inserted at a certain frequency (so-called "comma", typically the characters named K28.5). The problem is solved thanks to the known OIF technique by exploiting the fact that the transportable flow is only and solely a STM-64 frame (OC-192 in the SONET terminology): as already said, the STM-64 frame of 125 microseconds is aligned not only in order to extract the bytes to be inserted into the first 10 lines of the packet, but above all in order to align the flow of packets to the frame itself. The alignment of the STM-64 frame to the structure of packets P1 is possible as the number of bytes contained in the STM-64 frame (64*270*9=155520) is a multiple of the information content that is transportable by the packet (648*24*10=155520).

FIG. 2b illustrates the packet P1 at the starting point of the STM-64 frame: all the 192 A1 bytes and 48 A2 bytes are indicated as information content CI, which, in the SDH frames, are the bytes indicating the starting point of a frame.

FIG. 2c illustrates the same packet P1 at the starting point of the STM-64 frame, over which the first three columns with the codes K28.5, D3.1 and D21.2 have been overwritten: the codes K28.5, as already said, are used for selecting the bytes within each channel, as well as to select the channels (and therefore also the structures of the packets P1) one from each other, while the codes D3.1 (used in the first six channels) and D21.2 (used in the other six channels) are inserted to identify a possible wrong exchange of fibers during the installation of the optical connection (exchange of the first and the last fibers, of the second and the second-last fibers, and so on).

The need of inserting such frame designation bytes constitutes a trouble when, instead of a STM-64 data flow wherein it is possible to overwrite the first thirty bytes of the frame without troubles, there are other input signals with a different frame structure or also without any frame structure, as no overwriting of the payload, namely of the information content, is admissible.

SUMMARY OF THE INVENTION

The object of the present invention is to solve the above mentioned problems and to provide an interfacing method and apparatus for parallel connection having an improved implementation, which is more efficient than the known solutions of the prior art. In particular the present invention can be used with synchronous input signals having different frame structures, as well as not-framed signals, which allows to maintain a phase relationship with the output signal.

A further object of the present invention is to indicate an interfacing method which allows to introduce control signals into the data on the parallel connection.

A still further object of the present invention is to indicate an interfacing method which permits to employ an improved error correction method.

The above and further objects are obtained by a method according to claim 1, by an apparatus according to claim 10 and by a data packet according to claim 13. Further advantageous features of the invention are set forth in respective dependent claims. All the claims should be considered as an integral part of the present description.

Further objects, characteristics and advantages of the present invention will become clear from the following detailed description, given by way of a non-limiting example.

BRIEF DESCRIPTION OF THE DRAWINGS

In the drawings:

FIGS. 2a, 2b and 2c illustrate the diagrams of the information packets employed by the interfacing method according to FIG. 1;

BEST MODE FOR CARRYING OUT THE INVENTION

Figures 2A, 2B, 2C:
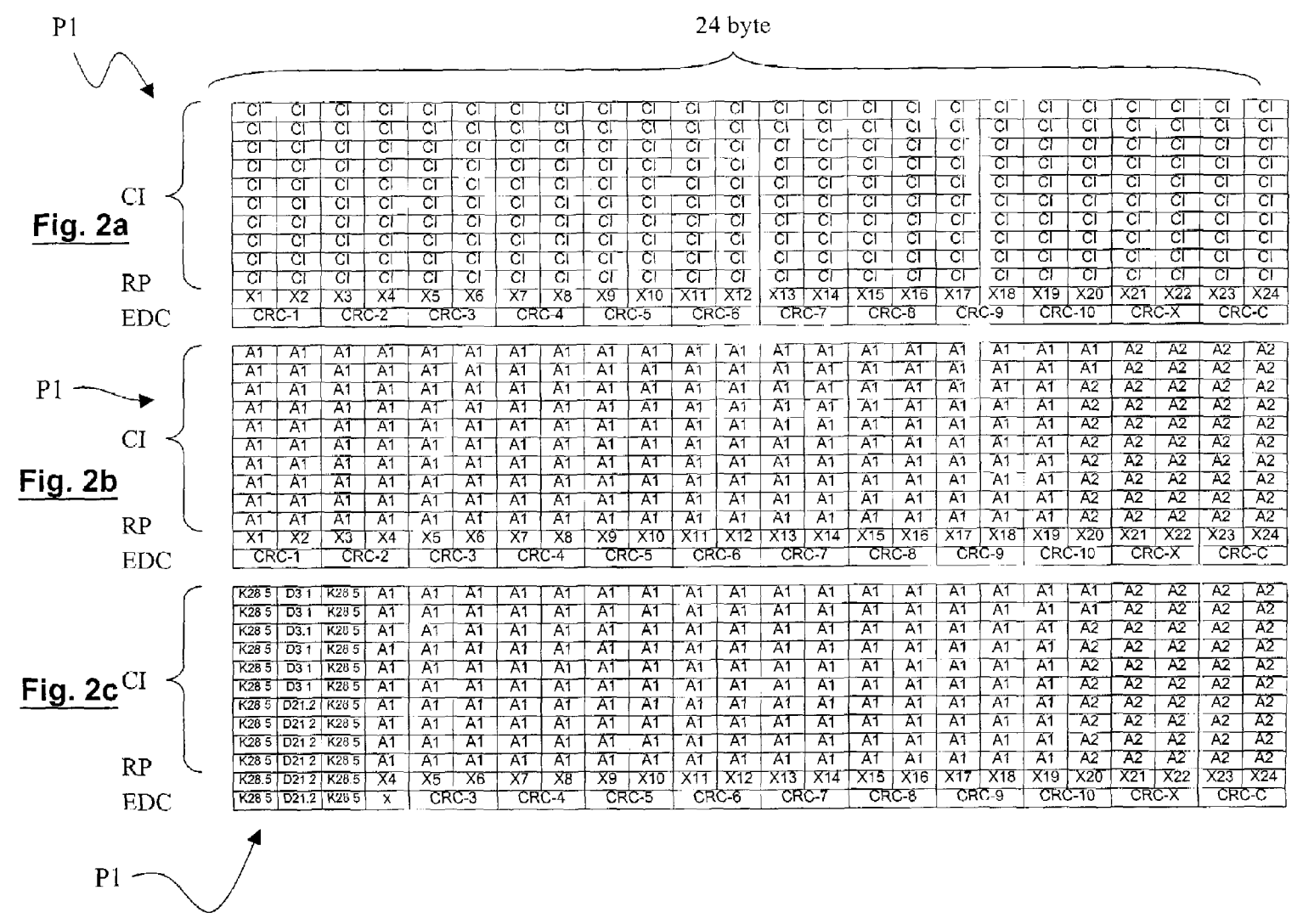
Figure 3:
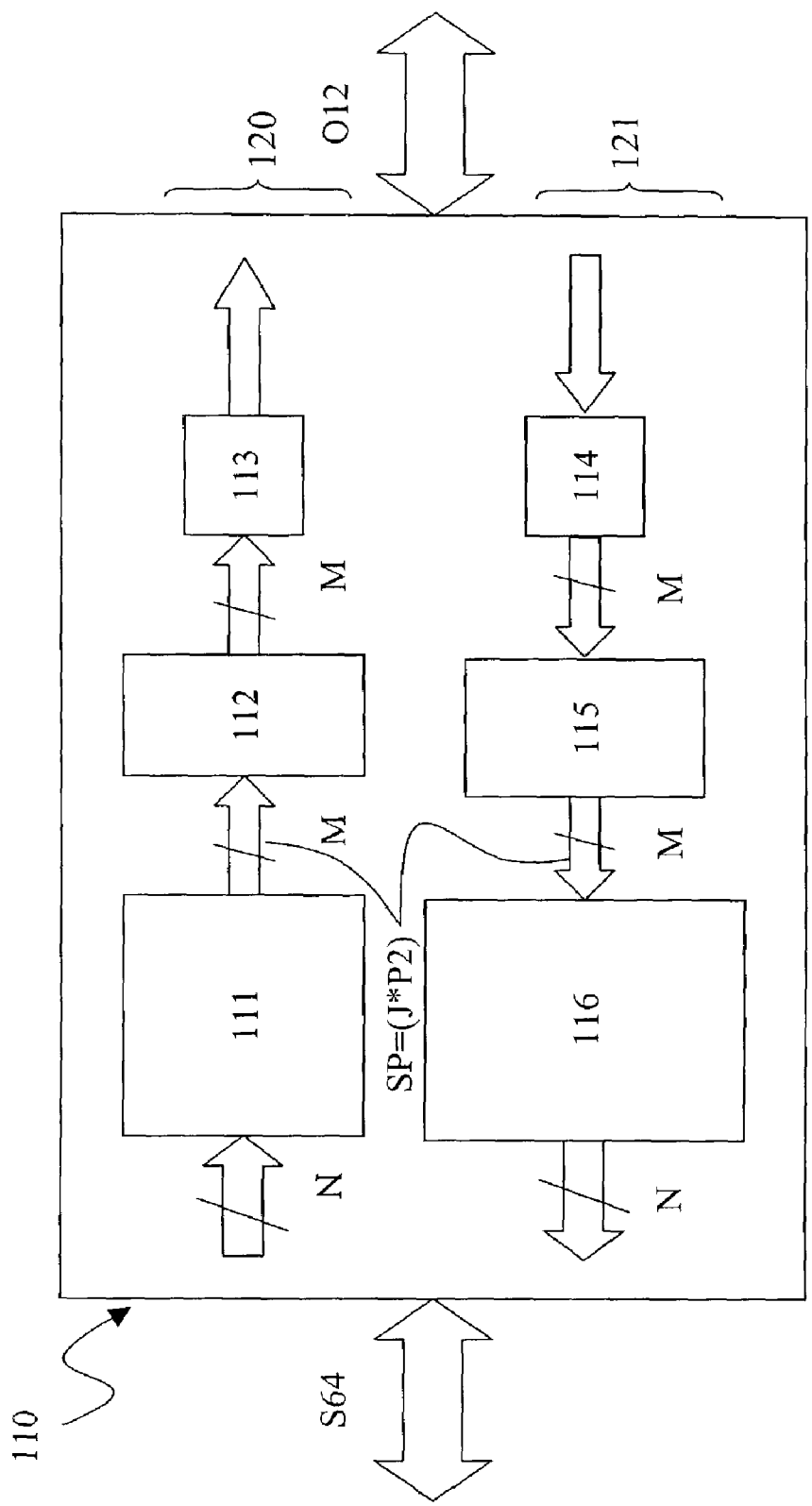
FIG. 3 illustrates a block diagram showing a partial basic diagram of a telecommunications network implementing an interfacing method according to the invention.
Figure 4:
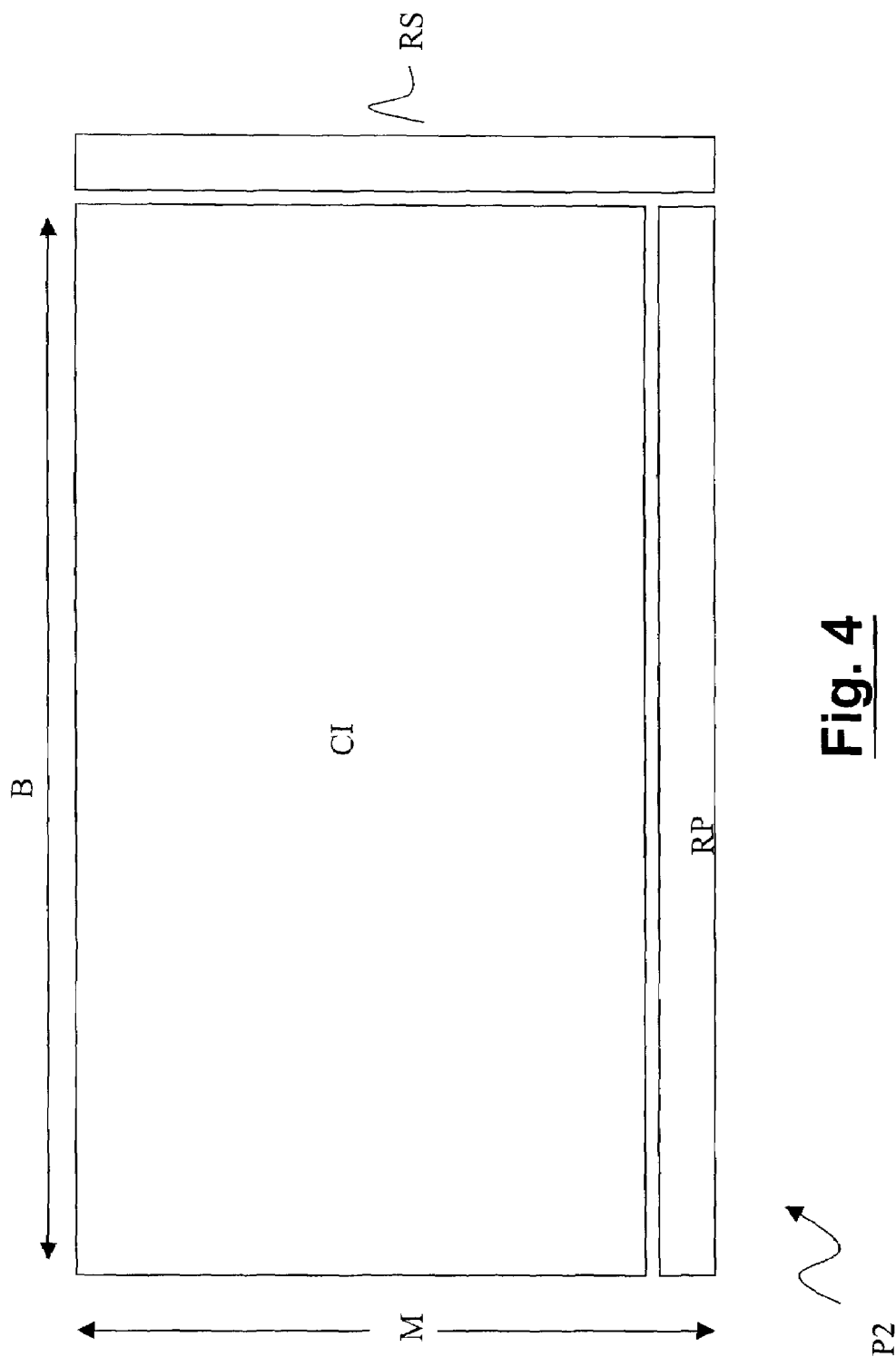
FIG. 4 illustrates a basic diagram of an elementary information packet employed by the interfacing method as shown in FIG. 3.

FIG. 3 illustrates a basic diagram of an interfacing apparatus 110 implementing the interfacing method according to the invention. Said interfacing apparatus 110 receives at the input a synchronous data flow S64, at N bits, to implement a connection O12, onto M independent flows. Through the back path, the same N-bit synchronous data flow S64 is obtained while maintaining now the phase of N bits at the output. In particular, the present invention is characterized by the presence of the parallel conversion element 111. The parallel conversion element 111 performs packeting functions of the information content CI in packets SP, which packets remarkably differ, in terms of structure, from the packets P1 of FIG. 2. Said packets SP are in fact constituted through the composition of J elementary packets P2. In FIG. 4 there is the example of an elementary packet P2 which is utilized, as it will become clear, as a basis for the construction of packets SP.

Said elementary packet P2 comprises M lines, according to the number of wires, fibers or channels of connection O12, and a number B+1 of columns, where B is an integer number, while the last line is a parity line RP which can contain B parity information (in such a case NP is chosen equal to 1) or not (in such a case NP is chosen equal to 0). The parameter NP indicates the number of parity lines.

The following equation, obtainable from simple considerations, is always true for the packets P2:

$$fo/fi=(N/(M-NP))*((B+1)/B)*Cr$$

where Cr is the coding line factor (in the embodiment illustrated in FIG. 5, Cr is equal to 10/8) and fo/fi is the relationship between the obtainable output and input bit-rates.

Figure 5:
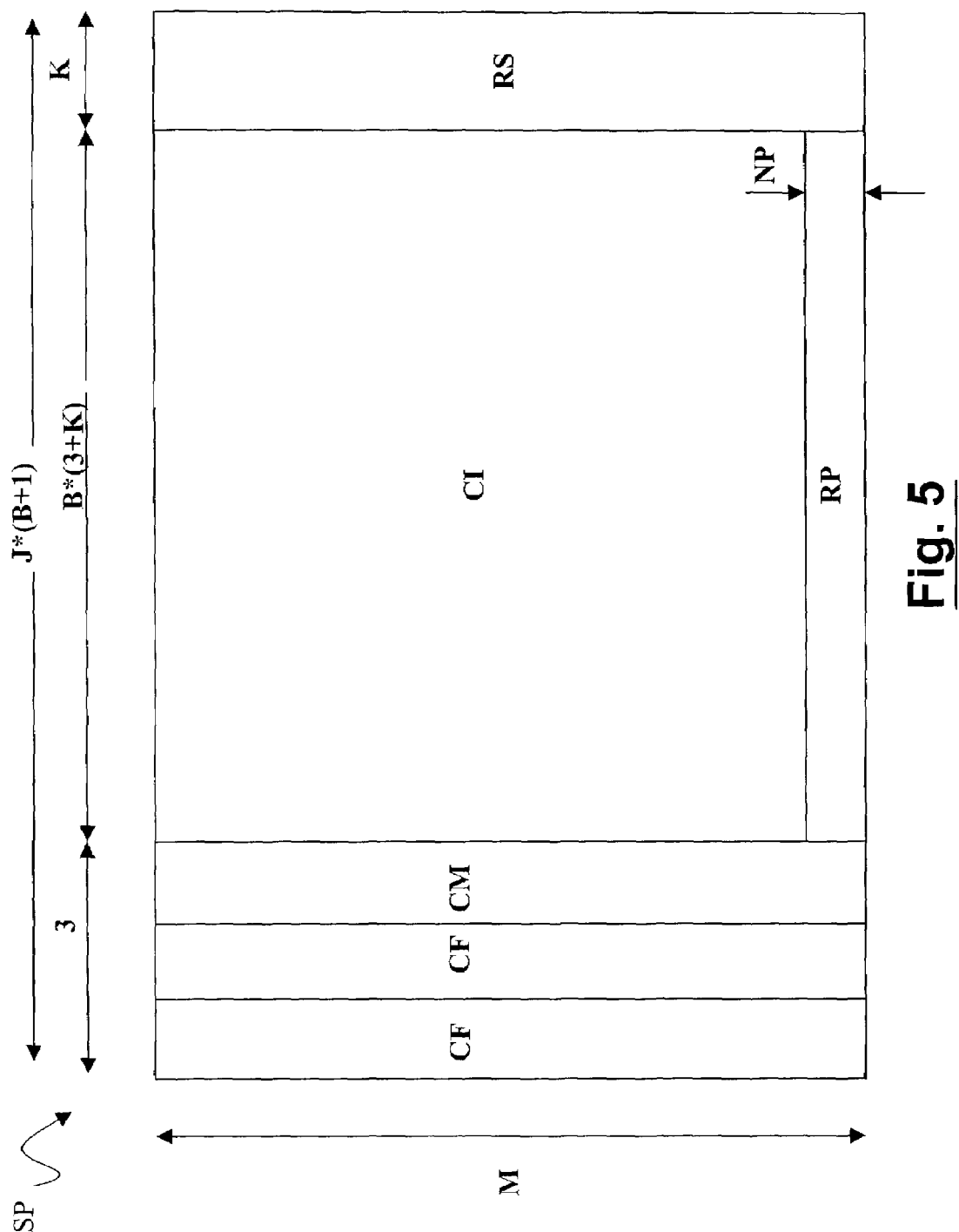
FIG. 5 illustrates a basic diagram of an information packet employed by the interfacing method according to the invention and defined by utilizing the elementary information packet of FIG. 4.

According to the present invention, the packets SP which are then sent towards the connection O12 are defined by grouping J elementary packets P2 in the element 111, with J being an integer number, and by distributing again the columns as shown, for instance, in FIG. 5. It is evident that the equation $$fo/fi=(N/(M-NP))*((B+1)/B)*Cr$$

that is always true for packets P2, is also valid for packets SP as above defined.

By way of a non limiting example of possible applications, there is hereunder the description of a possible embodiment according to the invention, employing the STM-64 flow parameters described while illustrating the prior art.

Figure 1:
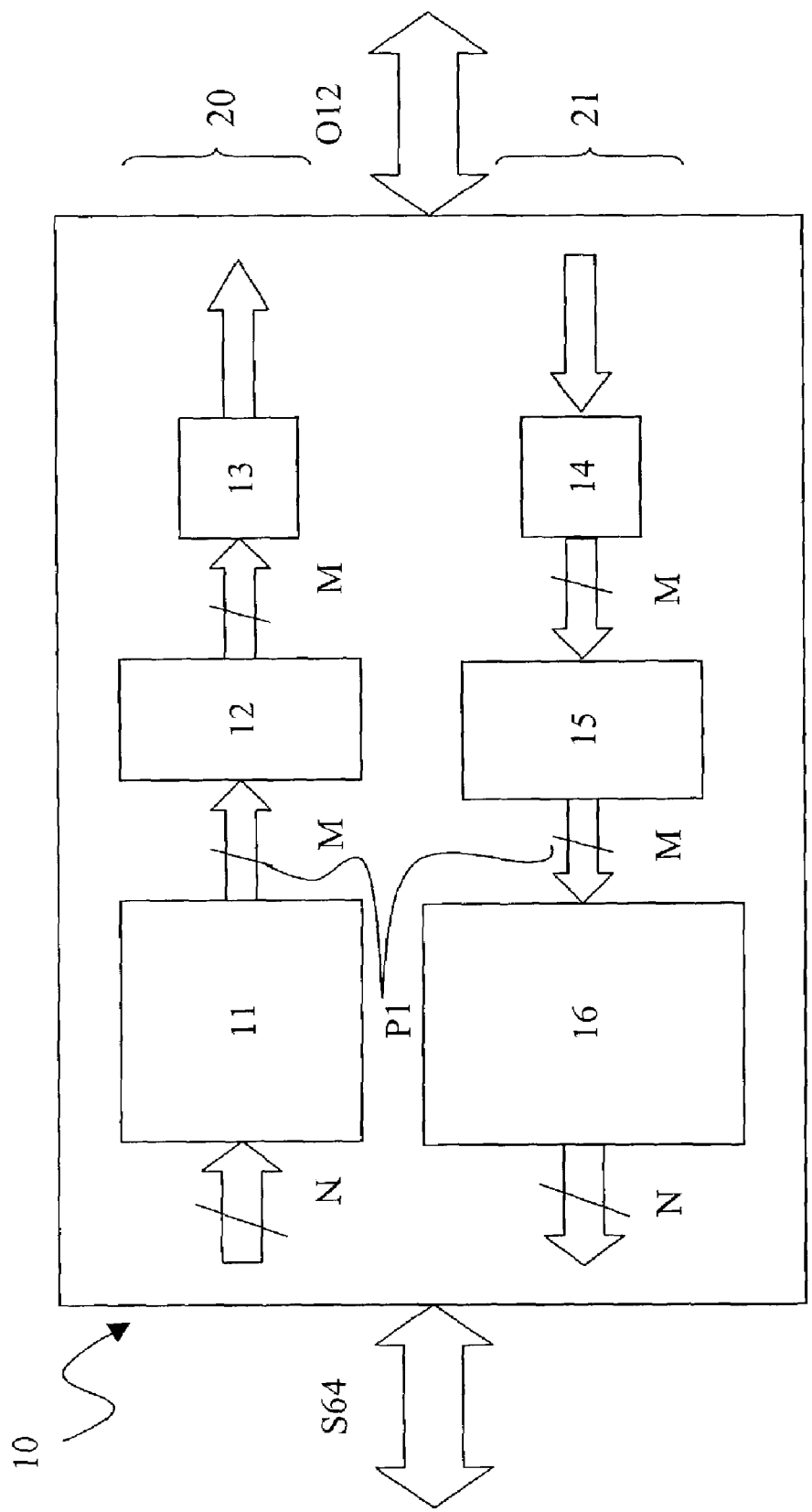
FIG. 1 shows a block diagram illustrating a partial basic diagram of a telecommunication network implementing an interfacing method according to the prior art.

If we set the relationship fo/fi equal to 2, that is 1244.16/622.08, NP equal to 1, N equal to 16, M equal to 12 and if we use the 8B/10B encoder for the line codification (Cr equal to 10/8), that is in the same conditions of the conversion illustrated in the FIGS. 1 and 2, the equation $$fo/fi=(N/(M-NP))*((B+1)/B)*Cr$$

is satisfied by the value B equal to 10.

The packet SP with B=10 is exemplified in FIG. 5, where we can see that three of the added columns are used for inserting two alignment columns CF for FAS (Frame Alignment Signal) signals, inserted for the alignment of the frame and/or of the bytes (the line encoder 112, that, in such an example is identical to the encoder 12, codifies these two columns through the control characters K28.5), as well as a multiframe header column CM for MOH byte (Multiframed Overhead byte). The payload or information content CI comprises, on the contrary, B*(3+K)*11 bytes, where K is an even integer ranging 0 to 16 which represents the number of bytes for each packet and channel that are reserved to the error correction Reed-Solomon (FEC). The result is that the packet SP, as shown in the FIG. 5, has K columns of error correction RS. In the case of FIG. 5, J is therefore equal to (3+K).

In this way, it is understood that the parallel conversion element 111 inserts a limited delay in the transmission vis-á-vis the prior art.

The possibility of inserting into the packet SP a column CM for the multiframe header MOH is particularly useful as the MOH byte is employed in a manner which is similar to the H4 byte, which, in the SDH structures, provides for a generalized indicator for multiframe structures, by indicating substantially the frame number inside of the multiframe structure. The values of MOH byte can be used also for transmitting information about the number of fibers, the back-signal control and the channel conditions. The insertion of the multiframe structure allows to extend the maximum differential delay which is compensable well beyond 62.5 microseconds of the prior art.

Another important characteristic of the interfacing method according to the present invention is that the phase of the input N bits in transmission is maintained the same as the N output bits in reception: this is simply obtained by adopting the same (specific) convention for inserting/extracting the information content into the packets SP (by possibly using the multiframe indication).

The K columns indicated by RS in the packet SP of FIG. 5 contain the FEC (Forward Error Correction) bytes, calculated on the bytes of each single line of information content CI (as well as the parity) with the known "Reed-Solomon" codification. This allows to improve the performances by correcting possible errors also in case of break of a single fiber. In addition, the possibility of choosing K equal to 2, 4, 6, . . . 16 allows for the correction of 1, 2, 3, . . . 8 wrong bytes per line, respectively.

Furthermore, the parity line RP, necessary to recover the information content in case of break of the fiber, can now, thanks to the interfacing method according to the present invention, be used under normal conditions for improving the corrective capacities of FEC (Reed-Solomon modified correction) as it will be briefly described in the following example. In the example, K is supposed equal to 2, as shown in the FIG. 5, only in order to simplify the explanation of the method, but it can be extended to all the other possible values of K.

If K is equal to 2 it is possible to correct, in an independent line-by-line manner, only one wrong byte (that is, it is possible to calculate 2 parameters: the position of the wrong byte and the error value); in the case of 2 wrong bytes in the same line, the Reed-Solomon correction "fails" by introducing, in general, a further error. By knowing, on the contrary, the 2 positions of the wrong bytes, it is possible to obtain the values of errors.

The modified correction Reed-Solomon method, employed together with the interfacing method according to the present invention is based on these considerations and comprises several steps.

In a first step, all the FEC-protected columns of the packet SP are examined one at a time (that is, the columns of information content CI in addition to the parity); each Reed-Solomon coding for each line of the packet SP suggests a correction to be done on the column in question (obviously the correction for a position is equal to zero, if the corresponding Reed-Solomon code does not reveal anything in such a position). The suggested corrections are operated only if the sum (XOR) of the elements of column after the correction is equal to zero (including the parity element). Thus, it is very improbable that a line Reed-Solomon code introduces an inadequate correction.

It is supposed to take a vector that is long as the number of the columns and that contains the sum of the corresponding column elements, including the RP line: this sum-of-columns vector signals the columns which contain errors. After the first step, the number of not null elements is surely decreased; even, in case that no more than a single error per line is present, all the elements of the sum-of-columns vector would be null (correction completed). On the contrary, if some lines contain two errors, the second step can be useful.

In the second step, all the columns are examined one at a time; if the corresponding element of the sum-of-columns vector is not zero, it is proposed as a correction value in each line. Each line supposes to correct through that value the column under examination, reconsiders the syndrome and calculates the other error, which of course shall occur in another column. If this second correction is equal to the other value contained in the sum-of-columns vector, both the corrections are accepted.

After the second step, all the lines affected by two errors, with the errors being in different columns, are corrected. If after carrying out the above two steps, one line (and no more than one line) has still errors, the third step will be performed.

Third step: sum-of-columns vector is considered and it is added (XOR) to the single wrong line remaining.

From the above description, the main features of the present invention, as well as the advantages thereof will be evident.

The interfacing method according to the present invention advantageously allows to employ synchronous input signals that are different one to each other in terms of frequency and frame structure, by obtaining an output parallel signal which maintains a phase relationship therewith. This is done by simply imposing a specific convention on the steps of inserting and extracting the information content in the packet composed by the elementary packet according to the present invention.

Since the packet SP contains added columns, these can be employed for writing alignment information and for correcting errors without overwriting the payload.

Advantageously, the interfacing method for parallel-link conversion according to the present invention possibly allows to insert further information into the packet at the output onto the optical connection, as for example the MOH byte.

In addition, advantageously, the parity line, thanks to the interfacing method according to the present invention, is used to improve the correction capacities of FEC (Reed-Solomon modified correction).

It is clear that the man skilled in the art can devise several variants to be applied to the interfacing method and/or to the interfacing apparatus and/or to the data packet that have been described as an example, without going out from the scope of protection of the invention. It is also clear that in the practical implementation, the forms of the illustrated details can be different, and the same can be replaced by technically equivalent elements.

In particular, the forms of the data frames on which the method according to the present invention is applied can be different and the method can be also applied to synchronous source data flows as OTN (for example OTU-2), 10 GbE-thernet (not only in the WAN version which is compatible with the STM-64/OC-192 signal, but now also in the LAN version which is made up of a frame-free signal) and to the transfer of generic data (for example ATM or IP protocols) by exploiting the property of maintaining the same phase between N input bits and N output bits.

The method according to the present invention can be applied in all the cases where an interfacing procedure is required between an input and an output flows which are synchronous, namely where a phase relationship thereamong should be maintained.

Furthermore, it is clear that the parity line, while it is useful for the error detection purposes, is not required by the interfacing method according to the invention, as said method can be applied also for a certain number NP of parity lines equal to zero. A number NP of parity lines is required only in the case of a protection against the break of a fiber and for the application of the above exemplified modified correction Reed-Solomon coding.

In this domain, it is possible to have, for example for an application performing the concentration of 7 Ethernet/Fast-Ethernet flows onto a Gigabit-Ethernet flow, the following parameters for the elementary packet P2 and the packet SP:

N=7, M=1, NP=0, Cr=10/8, fo/fi=10 which provides a value of B=7

In addition, by way of example, it is possible to have, for an intra-shelf connection among devices at 40 Gb/s, the following parameters:

N=16, M=17, NP=0, Cr=10/8, fo/fi=10/8 which provides a value of B=16.

The interfacing method according to the present invention is applied also in the anomalous case where M=1, that is, in the case wherein there is a single conductor or a single fiber to act as parallel connection. Also in such a case, of course, the number NP of parity lines is zero.

Then, there are also cases wherein M>N that is the number of conductors, and therefore the number of packet lines, is higher than the number of N bits of the input data flows.

We claim:

1. A method for interfacing a parallel connection, the parallel connection transmitting high bit-rate signals for a short distance, the method comprising:

receiving a synchronous N-bits input data flow, the N-bits input data flow being at a first input frequency;

inserting said input data flow into parallel packets, the parallel packets having a given length; and outputting said packets having a given length at a second output frequency onto a M-wires parallel connection, said method further comprising:

defining an elementary packet comprising M lines and B+1 columns, with B being an integer;

defining a parallel packet by employing an integer number of said elementary packets, said number of elementary packets being chosen in order to maintain a constant phase relationship between the input frequency and the output frequency according to a number of parity lines in the elementary packet and to a code factor onto the parallel connection;

inserting the input data flow into said parallel packet; and sending said parallel packet with the input data flow inserted therein into said parallel connection.

2. The method according to claim 1 wherein the step of defining a parallel packet by employing an integer number of said elementary packets comprises the step of choosing said integer number according to an equation $$fo/fi=(N/(M-NP))*((B+1)/B)*Cr$$

wherein NP is the number of parity lines, Cr the code factor that is inserted by a possible coding operation carried out onto the parallel connection.

3. The method according to claim 2 wherein it further comprises the step of inserting an information content of data flow in B columns and M-NP lines of the elementary packet.

4. The method according to claim 3 wherein it comprises the further step of inserting a parity line comprising B elements in the elementary packet.

5. The method according to claim 4 wherein it comprises the further step of using the (B+1)-th column as error correction column.

6. The method according to claim 5 wherein it comprises the further step of forming the packet through J occurrences of the elementary packet.

7. The method according to claim 6, wherein it comprises the further step of utilizing K of the J error correction columns of the packet as real error correction columns.

8. The method according to claim 7, wherein it comprises the further step of using the remaining J–K columns of the packet for inserting one or more alignment columns for aligning the frame and/or the bytes.

9. The method according to claim 8, wherein it comprises the further step of using the remaining J–K columns of the packet for inserting one or more frame header columns.

10. An apparatus for interfacing a parallel connection comprising:

a transmission path from a synchronous data flow to a parallel connection, said transmission path comprising:

parallel conversion means for packetizing an information content of the synchronous data flow and providing M flows of bytes onto the parallel connection by carrying out a re-allocation into packets having M lines; and line codification/serialization means providing the codification of M flows and converting from parallel to serial; and a receiving path from the parallel connection to the synchronous data flow, said parallel conversion means reallocating the synchronous data flow into elementary packets comprising M lines and B+1 columns; employing an integer number of said elementary packets in order to form a parallel packet, said number of elementary packets being chosen in such a way as to maintain a constant phase relationship between an input frequency and an output frequency according to a number of parity lines in the elementary packet and to a codification factor on the parallel connection; inserting the input data flow into said parallel packet, and transmitting it to the parallel connection.

11. The apparatus according to claim 10, wherein said parallel conversion means select said integer number of said elementary packets to define a parallel packet according to a relationship $$fo/fi=(N/(M-NP))*((B+1)/B)*Cr$$

where NP is the number of parity lines, Cr the codification factor inserted by a possible codification operation onto the parallel connection.

12. The apparatus according to claim 11, wherein the receiving path comprises line deserialization/decodification means to carry out the M data conversions from serial to parallel and the M flow independent decodifications, conversion and depacketizing means to implement the depacketizing of packets and to restore again the synchronous N bit data flow.

13. A data packet for implementing a method for interfacing a parallel connection, the parallel connection transmitting high bit-rate signals for a short distance, the method comprising:

receiving a synchronous N-bits input data flow, the N-bits input data flow being at a first input frequency;

inserting said input data flow into parallel packets, the parallel packets having a given length; and outputting said packets having a given length at a second output frequency onto a M-wires parallel connection, said the data packet being an elementary packet comprising M lines and B+1 columns, with B being an integer, a parallel packet being defined by employing an integer number of said elementary packets, said number of elementary packets being chosen in order to maintain a constant phase relationship between the input frequency and the output frequency according to a number of parity lines in the elementary packet and to a code factor onto the parallel connection, the input data flow being inserted into said parallel packet and sent into said parallel connection.

* * * * *